United States Patent

Angel et al.

Patent Number: 5,722,795
Date of Patent: Mar. 3, 1998

[54] NON-ABRASIVE SUBSEA MAT

[75] Inventors: Thomas M. Angel, Houma; Robbie Boudreaux, Montugut, both of La.

[73] Assignee: Submar, Inc., Houma, La.

[21] Appl. No.: 633,472

[22] Filed: Apr. 17, 1996

[51] Int. Cl.⁶ .................................................. F16L 1/12
[52] U.S. Cl. ...................................... 405/172; 405/158
[58] Field of Search ........................... 405/172, 17, 154, 405/158, 18–20, 169–171

[56] References Cited

U.S. PATENT DOCUMENTS

| | | | |
|---|---|---|---|
| 687,389 | 11/1901 | Wilhelmi | 405/172 |
| 4,242,010 | 12/1980 | Gjerde et al. | 405/172 X |
| 4,375,928 | 3/1983 | Crow et al. | 405/17 X |
| 4,477,206 | 10/1984 | Papetti et al. | 405/172 |
| 4,651,975 | 3/1987 | Howell | 405/17 X |
| 4,683,156 | 7/1987 | Waters | 405/19 X |
| 5,099,889 | 3/1992 | Ratzlaff | 138/110 |

Primary Examiner—Dennis L. Taylor
Attorney, Agent, or Firm—Wendy K. Buskop; Chamberlain, Hrdlicka et al.

[57] ABSTRACT

Non-abrasive pads are attached to the at least one side of concrete elements with nylon rivets that are embedded into the concrete when the latter is soft. A flexible rope is laced through the center of each element in two directions to form a mat in a row-column array. Adequate spacing is provided between each element to allow the mat to conform to an uneven seabed and cover the underwater installation. The non-abrasive pads separate the concrete elements from the underwater installation to prevent the concrete elements from scratching and ablating the delicate underwater installations. Grooves are provided in selected elements, and loops are provided at the outer edges of the mat to enable several mats to be linked together.

10 Claims, 7 Drawing Sheets

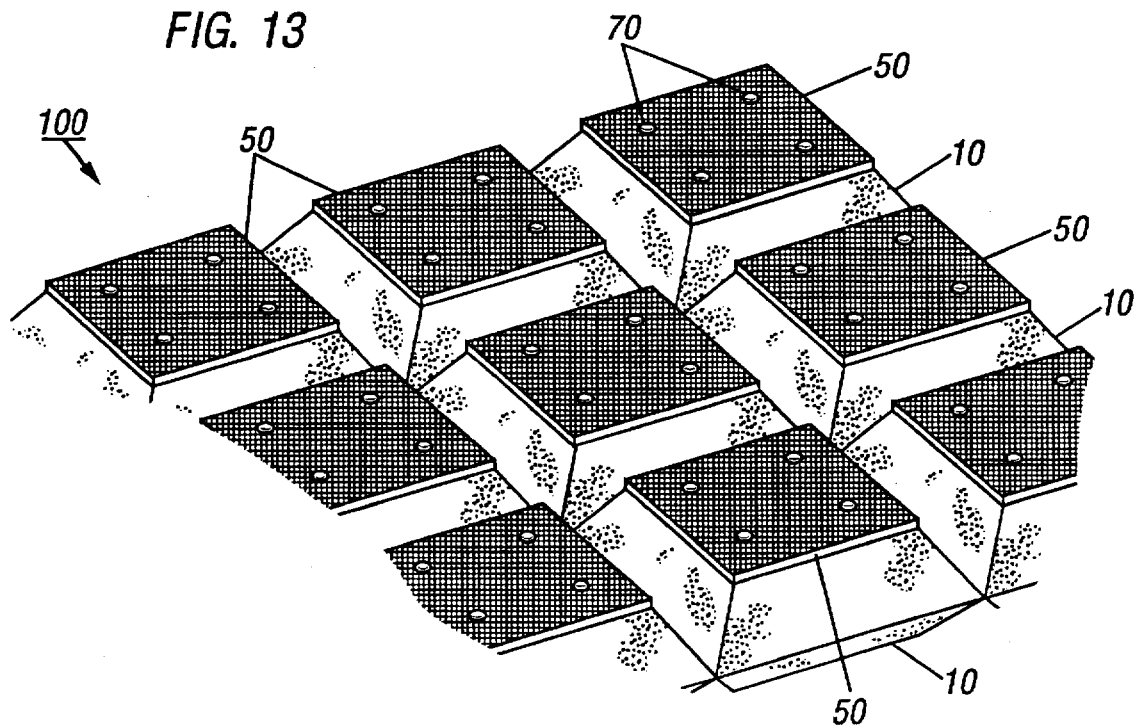

5,722,795

NON-ABRASIVE SUBSEA MAT

FIELD OF THE INVENTION

The present invention relates to mats. More particularly, the present invention relates to mats that stabilize and protect underwater pipes and other seabed installations.

BACKGROUND OF THE INVENTION

Articulated mats are used for offshore coastal and marine applications where separation, stabilization, protection and scour prevention is needed for pipelines and other underwater installations. These mats are particularly useful in areas where considerable hydrodynamic forces are generated by bottom currents and waves. Thus, for example, a seabed pipeline can be covered with such a mat so that the pipeline is stabilized by the weight of the mat. Another benefit of the mat is its ability to prevent erosion of the adjoining seabed. Examples of articulated mats, their components, and their uses are given in European patent specification 0152232, and U.S. Pat. Nos. 2,876,628; 2,674,856; 4,370,075; 4,357,928; 4,417,828; 5,052,859; and 5,193,937.

The most effective soil covering is concrete because of its high tensile and compressive strength and its almost endless resistance to the action of natural types of water. Unfortunately, concrete forms a hard surface which can scratch and ablate the thin-filmed epoxy coating that is used as a cathodic protection system for some underwater pipelines. The scratching of the epoxy coating is detrimental to the pipeline because the epoxy provides protection from external environmental conditions that cause the pipeline to corrode. Prior art mats required a tunnel with an insulating material as shown in U.S. Pat. No. 5,193,937 to prevent abrasion and unwanted thermal conduction. Another problem with prior art mats is their inability to be easily linked to one another after installation.

There is, therefore, a need in the art for an articulated seabed mat that can be easily linked to other mats. There is also a need in the art for subsea mats that do not scratch or ablate the protective epoxy coating of underwater pipelines and other underwater installations that would be detrimental to the cathodic protection system.

SUMMARY OF THE INVENTION

To prevent abrasion of sensitive underwater installations, the present invention provides special non-abrasive pads that are attached to at least one side of concrete elements. The pads are attached with nylon rivets that are embedded into the concrete when the latter is soft. The non-abrasive pads separate the concrete elements from the underwater installation to prevent the concrete elements from scratching and ablating the cathodic protection system or other delicate underwater installations. The nylon rivets, in conjunction with the non-abrasive pads, virtually guarantee that the epoxy film that protects pipelines will not be damaged.

The present invention also solves the problem of linking multiple mats in various patterns by including a groove in selected concrete elements that can accommodate the external loops used to transport and install the mats. These loops can be made long enough such that, when the loop is placed in the groove, the first mat is brought adjacent to the second mat and attached thereby. The groove-loop interconnection method allows for unusual linking configurations to be employed that can accommodate equally unusual seabed situations.

In order that the invention can be more fully understood, various embodiments thereof will now be described, by was of example only, with reference to the accompanying drawings.

BRIEF DESCRIPTION OF THE DRAWINGS

FIG. 13 is a perspective view of the subsea mat, with non-abrasive pad, of the present invention.

DETAILED DESCRIPTION OF THE INVENTION

Figure 1:
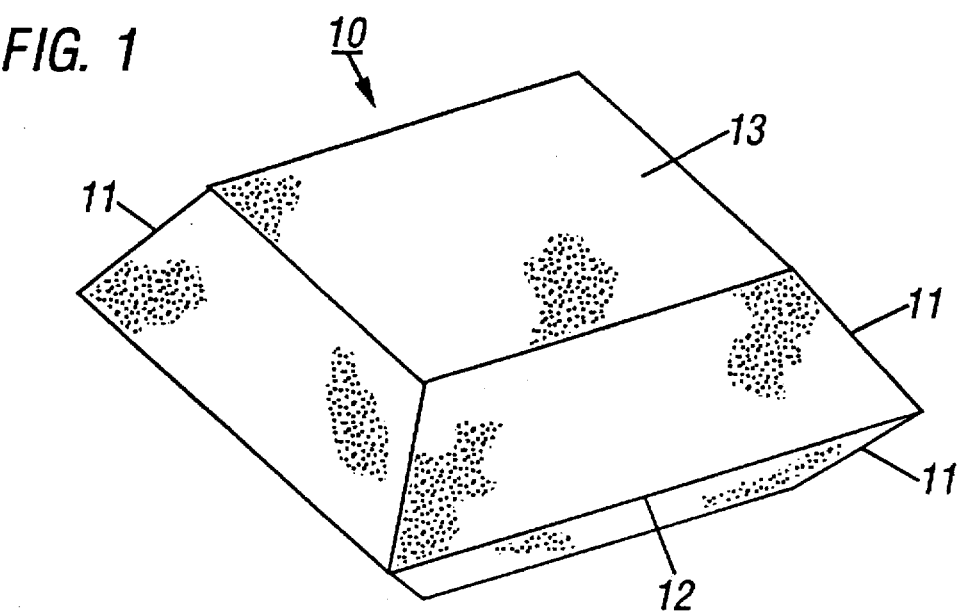
FIG. 1 is a perspective view of a single concrete element of the present invention.
Figure 2:
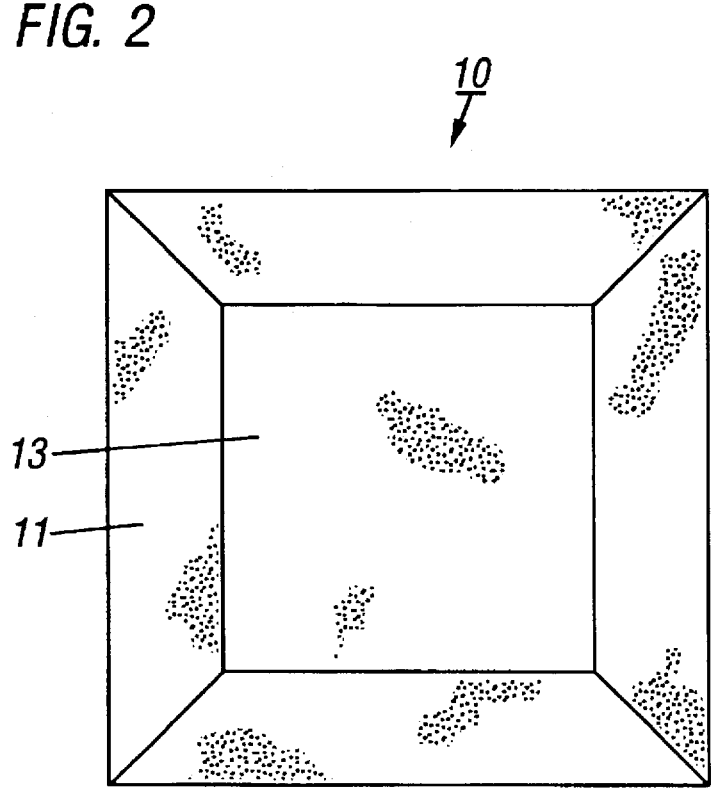
FIG. 2 is a top view of a single concrete element of the present invention.
Figure 3:
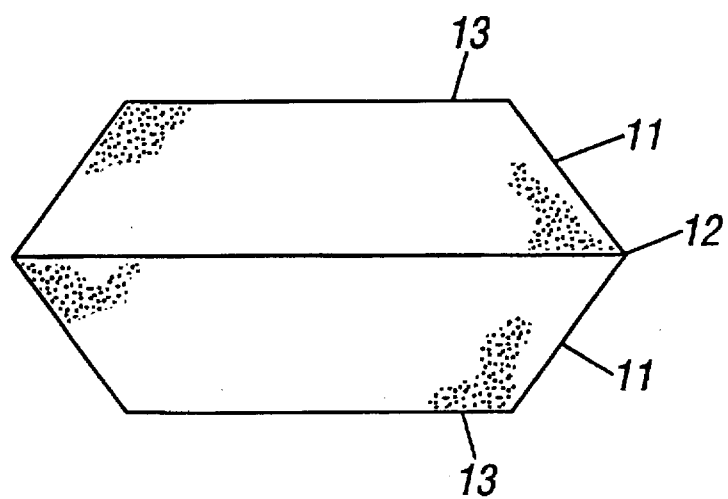
FIG. 3 is a side view of a single concrete element of the present invention.

The primary component of the present invention is a concrete element. Although there are a number of suitable shapes in the prior art, the preferred embodiment is shown in FIG. 1. The best shape for the concrete element 10 is two symmetrically opposed pyramids 11. The common rectangular base of the two opposing pyramids 11 form the center 12 of the concrete element 10. Each of the pyramids 11 is truncated at its top to form a face 13 as shown in FIGS. 1–3.

Figure 4:
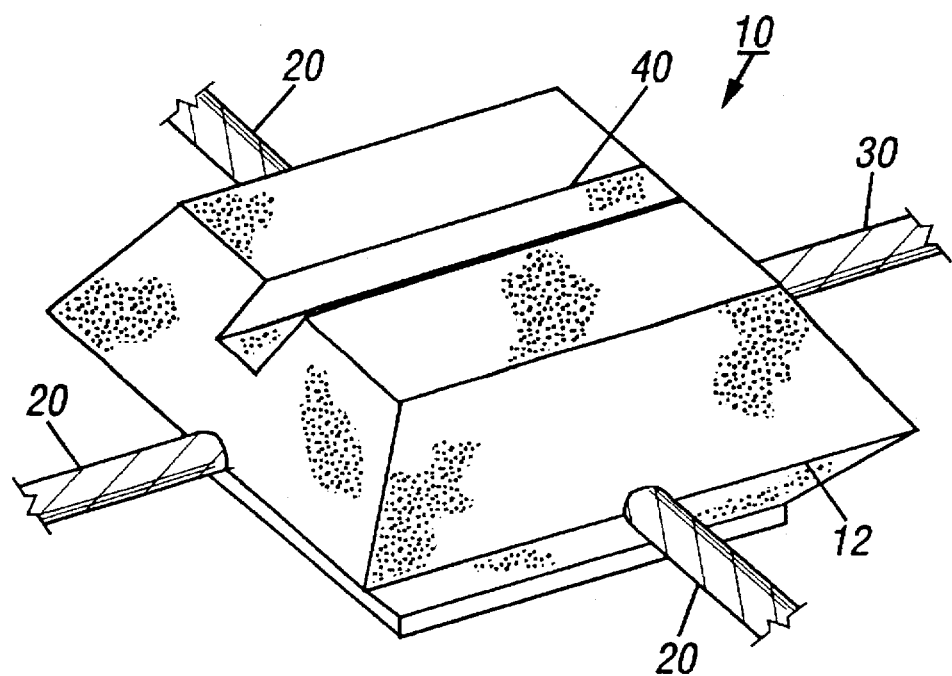
FIG. 4 is a perspective view of a single concrete edge element of the present invention.
Figure 7:
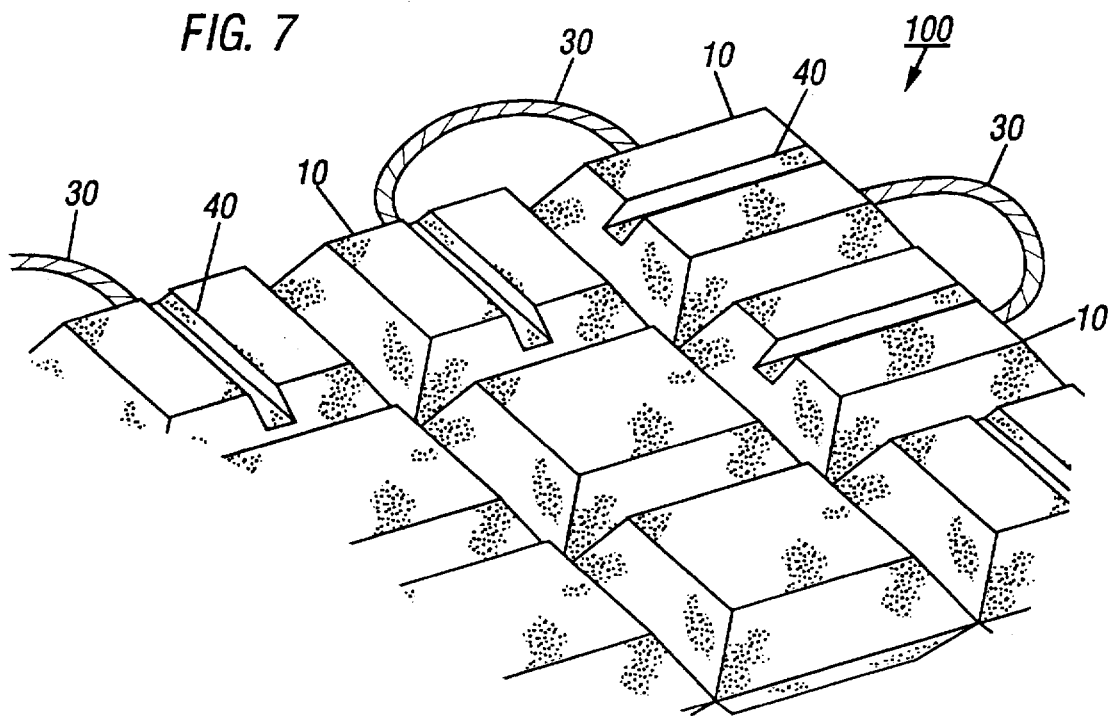
FIG. 7 is a perspective view of a corner portion of the subsea mat of the present invention.

To make a useful subsea mat 100, the concrete elements 10 are arranged in a row, column array as shown in FIG. 7. A flexible rope 20 is used to attach the concrete elements 10 to one another. Although the rope 20 can be attached to the elements 10 in a variety of fashions, it is best to form the concrete elements 10 around an orthoginal grid layout of ropes 20 to form a lace. In this way, ropes 20 can pass thorough the center 12 of the element 10 in two directions as shown in FIG. 4, and allow for maximum flexibility of the subsea mat 100. If there is a perceived need to have the center of gravity of the mat 100 as close to the one of faces 13 as possible, the mats may be laced at the particular face 13 of each element 10 (not shown).

Figure 5:
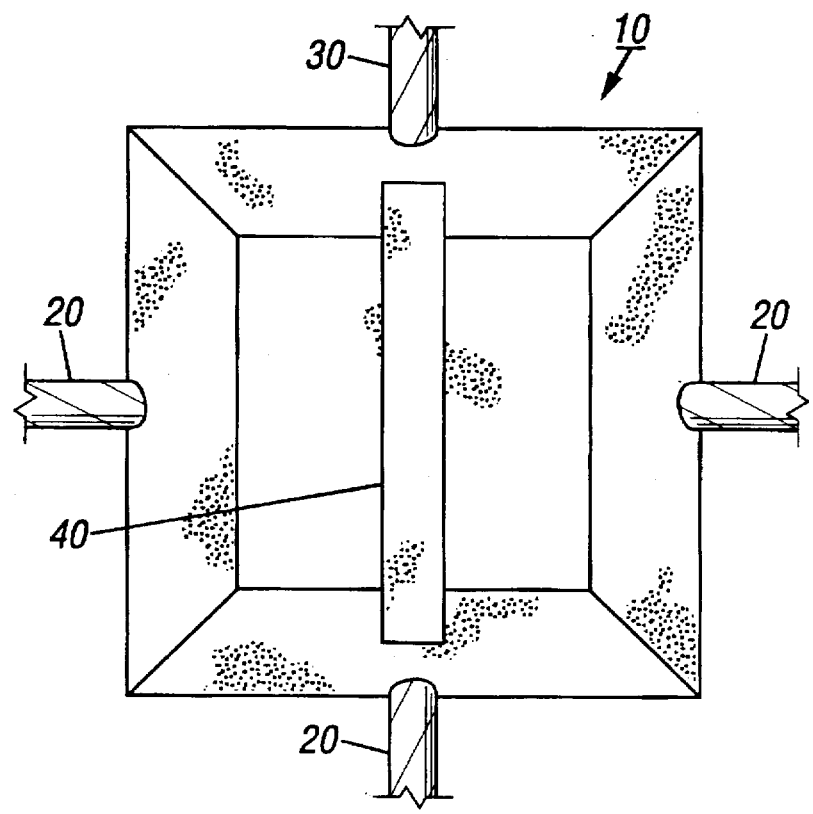
FIG. 5 is a top view of a single concrete edge element of the present invention.
Figure 6:
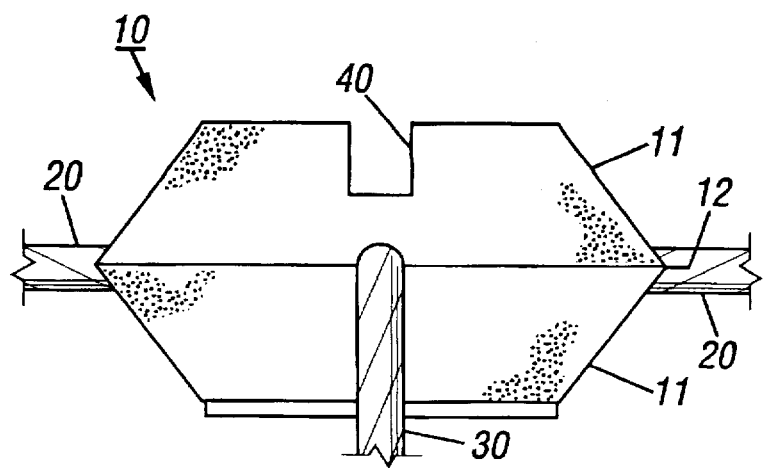
FIG. 6 is a side view of a single concrete edge element of the present invention.

The lace of the rope 20 leaves a small loop 30 at the exit and entrance of alternating rows and columns in the rope grid layout as shown in FIGS. 4 and 7. These small loops 30 are used to facilitate the handling and transportation of the mat 100. Elements 10 at the edge of the subsea mat 100 can be fitted with a groove 40 on one face 13 of the element 10 as shown in FIGS. 4–6. The groove 40 is constructed and arranged to allow the small loop 30 of a first subsea mat 100 to be placed within the groove 40 of a second subsea mat 100, thereby attaching the mats together. To complete the locking of mats, the small loop 30 of the second subsea mat 100 can be placed within the groove 40 of the first subsea mat 100.

Figure 8:
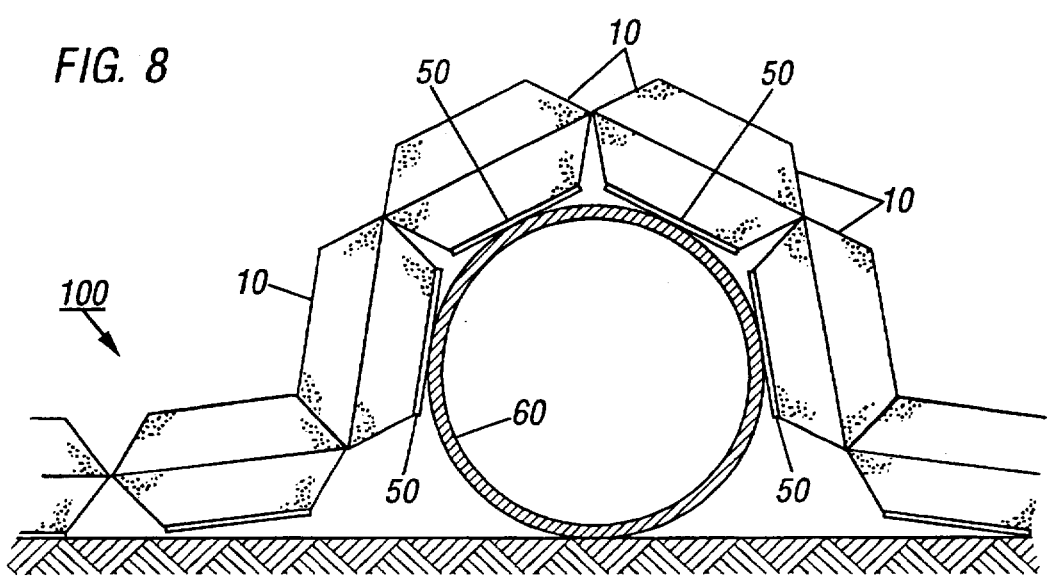
FIG. 8 is a side view of present invention covering an underwater installation.
Figure 9:
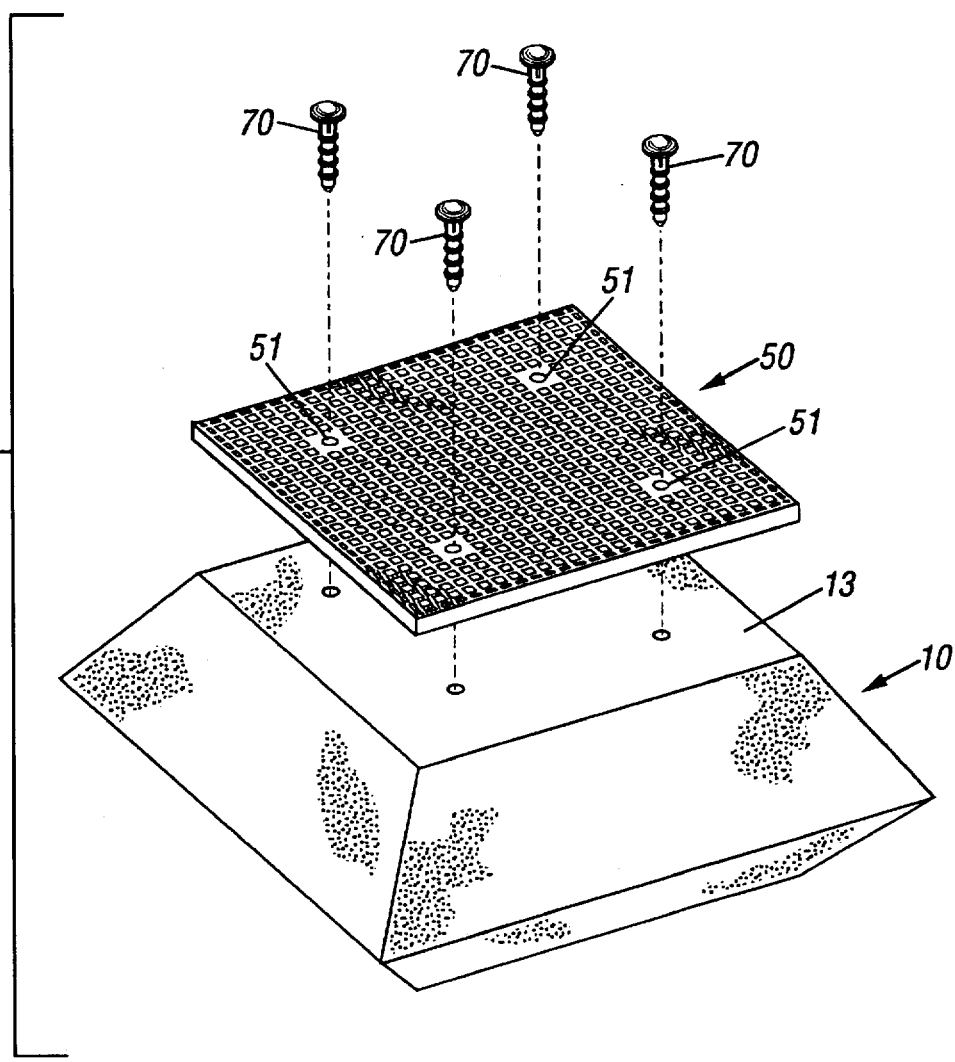
FIG. 9 is a perspective view of the assembly of the non-abrasive pad onto a single concrete element of the present invention.

As mentioned before, the purpose of the subsea mat is the protection of underwater installations and the stabilization of the seabed near the installation. However, some subsea installations are covered with a delicate protective coating which can be damaged by the surface of the concrete element 10 of the mat 100. To preserve the delicate coating of subsea installations, a non-abrasive pad 50 is attached to at least one face 13 of the concrete element 10 as shown in FIG. 9. The non-abrasive pad 50 is situated between the concrete element 10 and the subsea installation 60 as shown in FIG. 8. The best material for the non-abrasive pad 50 is low-density polyethylene ("LDPE") although polyvinyl chloride ("PVC") and nylon also work well. As the pads 50 have no appreciable affect on the seabed, the pads 50 may be eliminated from those elements 10 which would not come in contact with the subsea installation 60. In the preferred embodiment, each of the elements 10 are fitted with a pad 50 so that any portion of the mat may be placed onto the subsea installation 60.

Figure 10:
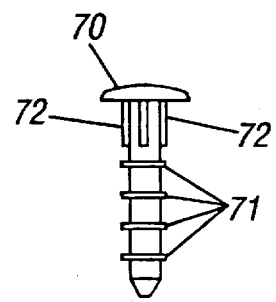
FIG. 10 is a nylon rivet used to attach a non-abrasive pad onto a concrete element of the present invention.

As shown in FIG. 9, the non-abrasive pad 50 is attached to the concrete element 10 by rivets 70 at the hole 51 of the non-abrasive mat 50. A profile of a typical rivet 70 is shown in FIG. 10. Although the rivets 70 may be placed into the element 10 by a variety of means, it is best to form the concrete element 10 around the rivets 70 to provide the most secure attachment of the non-abrasive pad 50 to the element 10. Rivet 70 is fitted with several ribs 71 which enhance the ability of the rivet 70 to keep the non-abrasive pad 50 attached to the element 10 after the concrete is formed around the rivet 70. Rivet 70 is also fitted with several flanges 72 as shown in FIG. 10. The flanges 72 are pressed into the non-abrasive pad 50 at the hole 51 in order to eliminate lateral or rotational movement of the non-abrasive pad 50 in relation to the rivet 70.

The best material for the rivet 70 is nylon. Suitable materials are PVC and LDPE. Other materials can be substituted for nylon if those materials are not abrasive to the protective coating of the subsea installation and the substitute material does not deteriorate significantly in sea water. In the most advantageous configuration, four rivets are fitted onto each non-abrasive pad 50 and the concrete element 10 is formed around the rivets ribs 71 of the rivet 70. In the preferred embodiment, each element 10 is fitted with a non-abrasive pad 50 on one face 13 as shown in FIG. 13.

Figure 11:
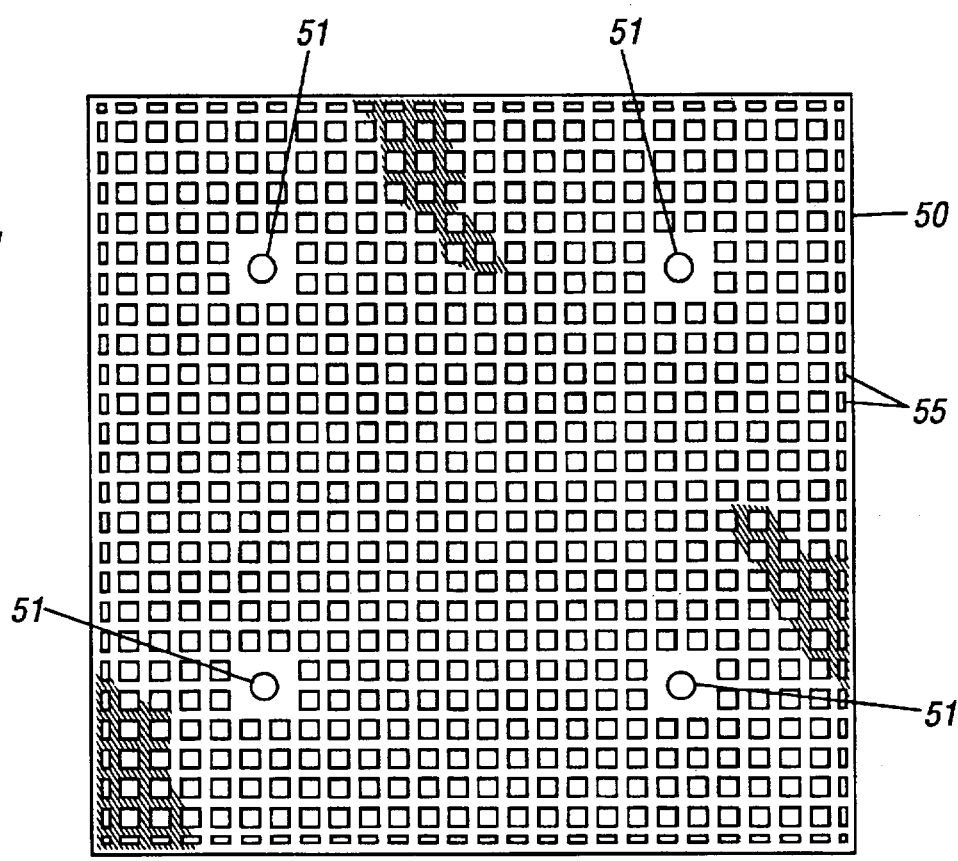
FIG. 11 is a top view of the non-abrasive pad of the present invention.
Figure 12:
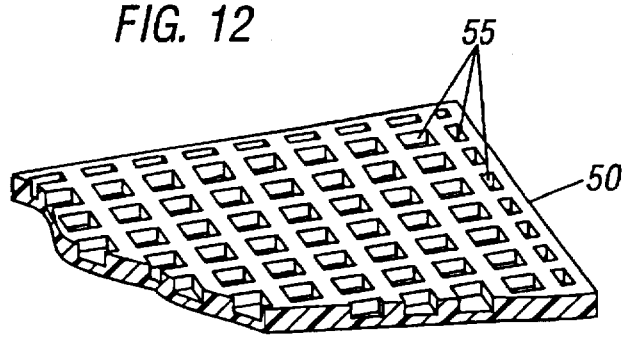
FIG. 12 is a partial perspective view of the non-abrasive pad of the present invention.

A typical non-abrasive pad 50 is shown in FIGS. 11 and 12. Pad 50 is fitted with four rivet holes 51 which allow the rivet 70 to be fitted onto the pad 50 as shown in FIG. 9. In the optimum configuration, pad 50 contains an array of openings 55 as shown in FIGS. 11 and 12. The openings 55 serve a dual function. They insulate the concrete element from the thin film epoxy coated pipeline and allow the impressed current to flow through the non-abrasive pad to the pipeline.

Although the present invention is described and illustrated above with detailed reference to the preferred embodiment, the invention is not limited to the details of such embodiment but is capable of numerous modifications, by one of ordinary skill in the art, within the scope of the following claims.

We claim:

1. A mat for stabilizing and protecting underwater installations comprising:

a plurality of elements, each of said elements having the shape of two symmetrically opposed pyramids, each of said pyramids having a truncated top forming a face, each of said pyramids further having a common rectangular base that forms a center of said element, said elements arranged in parallel rows and columns with sufficient space between each of said elements to allow adjacent elements to conform to an uneven seabed and underwater installation;

a flexible rope, said rope constructed and arranged to pass through said center of each of said elements in two directions and embedded therein to fasten said elements to each other by said rows and by said columns, said rope providing a small loop at the exit and entrance of alternating rows and alternating columns for the purpose of handling said mat during transportation and installation;

at least one non-abrasive pad, said non-abrasive pad attached to at least one of said elements by at least one rivet embedded in said element, said non-abrasive pad situated on at least one of said faces of said element to separate said element from said underwater installation in order to prevent said elements from contacting said underwater installation, wherein said at least one non-abrasive pad defines a plurality of first openings which receive said rivets, and second openings which permit impressed current to pass through said non-abrasive pad therein.

2. A mat according to claim 1 wherein said rivet is made of nylon.

3. A mat according to claim 1 wherein said non-abrasive pad is attached to each of said elements.

4. A mat according to claim 1 wherein said non-abrasive pad is attached to one of every two of said elements.

5. A mat according to claim 1 wherein said non-abrasive pad is attached to said face of said element with a plurality of rivets.

6. A mat according to claim 1 wherein said non-abrasive pad is attached to each of said elements, said non-abrasive pads are attached to said elements with a plurality of rivets.

7. A mat according to claim 1 wherein said non-abrasive pad is attached to at least one of said faces of one of every two of said elements, said non-abrasive pads are attached to said elements with a plurality of rivets.

8. A mat according to claim 1 wherein said non-abrasive pad is made of polyvinyl chloride.

9. A mat according to claim 1 wherein said non-abrasive pad is made of low-density polyethylene.

10. A mat according to claim 1 wherein at least one of said elements further having a groove, said groove constructed and arranged to allow said loop of a second mat to be placed into said groove in order to attach said second mat to said mat.

* * * * *